United States Patent
Ivanovich et al.

(10) Patent No.: US 6,272,921 B1
(45) Date of Patent: Aug. 14, 2001

(54) ULTRASOUND SENSOR FOR DETECTING THE LEVEL OF LIQUIDS

(76) Inventors: Balin Nikolai Ivanovich, Moskovskoe shosse, d. 10, kv. 73, 196158, Sankt-Petersburg; Demchenko Aleksandr Petrovich, nab. r. Mooiki, d. 42, kv. 5, 191186, Sankt-Petersburg; Cyrkov Vladimir Afanasevich, Nevskv pr.. d.148. kv. 3., 193024, Sankt-Persburg, all of (RU)

( * ) Notice: Subject to any disclaimer, the term of this patent is extended or adjusted under 35 U.S.C. 154(b) by 0 days.

(21) Appl. No.: 09/308,289

(22) PCT Filed: Jun. 22, 1998

(86) PCT No.: PCT/RU98/00210

§ 371 Date: May 12, 1999

§ 102(e) Date: May 12, 1999

(87) PCT Pub. No.: WO99/14562

PCT Pub. Date: Mar. 25, 1999

(30) Foreign Application Priority Data

Sep. 15, 1997 (RU) .................................................. 97115533

(51) Int. Cl.[7] ..................................................... G01F 23/28
(52) U.S. Cl. ........................................................... 73/290 V
(58) Field of Search .................................. 73/290 V, 644; 340/621

(56) References Cited

U.S. PATENT DOCUMENTS

| 4,594,891 | 6/1986 | Benz et al. | 73/290 V |
| 4,785,663 | 11/1988 | Hermann | 73/290 V |
| 5,651,285 | * 7/1997 | Legras | 73/290 V |

FOREIGN PATENT DOCUMENTS

| 2281621 A | 3/1995 | (GB) . |
| 1721443 A1 | 3/1992 | (SU) . |

* cited by examiner

Primary Examiner—John E. Chapman
(74) Attorney, Agent, or Firm—Birch, Stewart, Kolasch & Birch, LLP

(57) ABSTRACT

An ultrasonic liquid level detector includes a detector case (1), a rod acoustic waveguide (2) on one end of which there is an acoustical-electrical transducer (3) and on the other end a hollow resonator (4). The resonator (4) space is isolated from an external medium. The detector case (1) is fixed rigidly and hermetically on the surface of the rod acoustic waveguide (2) in a zone of minimum rod oscillations of the rod acoustic waveguide at operating detector frequency and contains an attachment means for attaching the detector to an external base.

5 Claims, 4 Drawing Sheets

THE TIME DIAGRAM, WHEN THE DETECTOR IS IN A GAS

THE TIME DIAGRAM, WHEN THE DETECTOR IS IN A LIQUID

ULTRASOUND SENSOR FOR DETECTING THE LEVEL OF LIQUIDS

APPLICATION FIELD

The invention relates to liquid level indicators using measurement of sound waves parameters.

BACKGROUND OF THE INVENTION

Designs of ultrasonic liquid level detectors are known where resonators and tuning forks are driven with the help of sound waves. The acoustic parameters of resonators and tuning forks vary when contacting liquid, a medium with higher density than air, and these variations are detected.

The design according to DE patent N 4201360 can serve as an example. The device contains two or more vibratory rods put into a reservoir under control, which are connected with radiating and receiving transducers. The same principle is used with the "Device for detection and/or control of filled reservoir level," according to DE patent N 4118793, or the "Device for measurement and/or keeping of given level in a reservoir," according to the International application WO 92/21945.

The given designs of the liquid level detectors depend on operating conditions. Liquid and dirt remaining in the tuning fork spaces can influence measurement accuracy of the mentioned devices.

A device for liquid level detection is known from DE patent N 3011603 priority 26.03.80, Int. Cl. G 01 F 23/28. The device contains vibratory elements placed co-axially. The space between the vibratory elements is isolated from the medium and is located along the whole length of the rod. Piezoelements are fixed on membrane inserts connected to one of the vibrators. The case of the device is fixed to the membrane insert. The attachment joint of the device case to the external basement is made in the form of a threaded connection. The device differs from the offered invention in operating principle and design.

A further device for liquid level control is known from DE application N 2949162 priority 06.12.79 Int. Cl. G 01 F 23/28. The device has a hollow portion along the whole length of a waveguide, to which a radiator and receiver are fixed in different places. The case is not rigidly fixed to the waveguide and includes a threaded connection for fixing it to the external base.

Moreover an acoustic liquid level detector is known from FR application N 2596515 priority 28.03.86 Int. Cl. G 01 F 23/28. The detector contains a hollow rod along the entire length and is open to the surrounding medium. Another hollow pattern along the length of the waveguide is installed inside the rod on which transducers are installed. The waveguide attachment points to the external base are not considered in this design.

An ultrasonic liquid level indicator is known from SU Inventior's Certificate N 231151, wherein the detector consists of two separated waveguides. The waveguides are fixed in the walls of a reservoir under control of the oscillation nodes.

The designs of all above mentioned ultrasonic detectors differ from the offered one. In particular, protection from the influence of condensate, any remaining liquid and dirt on measurement accuracy is not provided in the above designs.

The "Detector of Liquid Presence" according to EP patent N 409732 priority 19.07.90 Int. CL. G 01 F 23/28 is the closest in technical principle. The design of the detector includes a case, a measuring element connected with a pulse generator and a receiving device. The measuring element of this device includes an acoustical-electrical transducer and a compound acoustic waveguide connected to the transducer. The first part of the compound acoustic waveguide consists of a solid cylinder and the second one consists of a hollow cylinder. The first part of the waveguide is smaller in diameter than the second one.

The performance accuracy of the given detector design depends on conditions of the surrounding medium. Liquid and other contaminates can accumulate in the open space. Liquid and dirt can also gather on the transducer and on the waveguide case where the junction (transition) to a greater diameter occurs. All these can influence the accuracy of the detector performance.

SUMMARY OF THE INVENTION

It is an object of the present invention to reduce detector performance dependence on a surrounding medium and various operating conditions, thereby providing high accuracy and sensitivity.

The ultrasonic liquid level detector according to the present invention contains a detector case and a rod acoustic waveguide on one end of which there is an acoustical-electrical transducer and on the other—a hollow resonator. The acoustical-electrical transducer provides excitation of the rod acoustic waveguide, which will oscillate on operating frequency depending on the resonator. Oscillation duration of the excited resonator will depend on whether it is placed in a gaseous medium or has contact with liquid.

The novelty consists of the following.

The resonator cavity is isolated from the external medium. Such a design avoids accumulation of liquid and foreign matter, and thus diminishes measurement errors. The resonator space is placed on the end opposite to the acoustical-electrical transducer of the waveguide. The space is placed where it is necessary to control the liquid level. This allows to reduction in the influence of dirt and condensate, because foreign matter deposited on the waveguide part, which is not hollow, does not practically influence measurement accuracy.

The detector case is fixed rigidly and hermetically on the surface of the rod acoustic waveguide in the zone of minimum rod oscillations of the rod acoustic waveguide at detector operating frequency. Such case fixing on the rod acoustic waveguide avoids ingress of moisture and foreign matter to the acoustical-electrical transducer and onto the waveguide upper part. Therefore, operation accuracy and sensitivity of the detector are not reduced as a result of the rigid case being fixed to the rod acoustic waveguide, because it is fixed in the zone of minimum oscillations of the waveguide rod.

The detector case contains an attachment means for attaching said case to the external base. The location of the attachment means on the case also serves as the solution of the set task. Since the mass on the case, even though it is rigidly and hermetically fixed on the acoustic waveguide, influences the detector parameters only minimally, the case fixed on the external base by means of the attachment means does not practically influence detector parameters regardless of the base type.

In such a design there is no place on the rod acoustic waveguide where liquid, condensate and dirt can gather. The case isolates entirely the acoustical-electrical transducer and the waveguide part from external surroundings. Moreover, the case does not practically influence the detector parameters, regardless of where on whatever base the case is installed.

In a particular embodiment the resonator space is isolated from the external surrounding by a plate which is rigidly and hermetically fixed to the rod acoustic waveguide. The plate thickness is less than W/12, where W is the sound wave-length in the rod acoustic waveguide at operating frequency. Such a plate thickness does not practically influence the detector sensitivity.

Besides, the case fixing zone on the surface of the rod acoustic waveguide should be placed in the nodes of longitudinal waveguide oscillations.

Such zone position under concrete values of detector operating frequency provides minimum case influence on detector parameters. For this purpose the distance between the fixing place and the transducer should be equal to an odd number of wavelengths quarters that with regard to acceptable spreads of this distance (equal to W/12) leads to the condition $$W/4*[(2*k+1)+\tfrac{1}{3}] > L > W/4*[(2*k+1)-\tfrac{1}{3}],$$

where

W—sound wavelength in the rod acoustic waveguide at operating frequency;

k—integer value.

Additionally, the thickness of the detector case in the place of fixing on the rod acoustic waveguide is less than W/12, where W is the sound wave-length in the rod acoustic waveguide at operating frequency. It is necessary to provide minimum case influence on detector sensitivity.

In addition, the attachment means of the detector case for attaching the case to the external base is made in the form of a threaded connection. Such a means of attachment provides additional effects. For example, parasitic oscillations of the external base passed to the detector case are absorbed to a large extent by the threaded connection, and are then emitted in the form of heat energy. This provides detector performance which is substantially from external conditions.

Thus, all of features of the offered invention promote less dependence of the detector performance on environment and operating conditions, without reduction of its measurement accuracy and sensitivity.

The main features set of the given design also provides additional effects.

Rigid and hermetic fixing of the detector case on the rod acoustic waveguide provider detector fire safety, because it isolates the acoustical-electrical transducer from the operating medium, the level of which is measured by the detector. Therefore, fire hazardous liquids can form such a medium.

Another additional effect results due to the fact that the rigid fixing of the detector case on the rod acoustic waveguide does not influence the detector performance only at the operating frequency. For acoustic oscillations of other frequencies which may influence the detector accuracy, the case acts as an acoustic filter. Thus in the given design, the detector noise immunity increases. The plate isolating the resonator space of the rod acoustic waveguide plays the same role but to a lesser extent.

Since the waveguide is fixed to the case in the zone of oscillations nodes, i.e. in the zone characterized by high acoustic impedance, the external actions lead to small oscillations in the waveguide at operating frequency because acoustic impedance depends on frequency. Such fixing can be considered as an acoustic rejection filter at operating frequency.

Positioning of the sensitive zone, the hollow resonator, at the end of the rod acoustic waveguide allows the detector to be placed arbitrarily at the installation site. The rod acoustic waveguide can contact with liquid and the spatial arrangement of the detector does not practically influence the detector properties to determine the liquid level. The contact with liquid of the rod acoustic waveguide zone where the hollow resonator situates is important for measurement. That is why the detector can be oriented arbitrarily; the main thing is that the resonator should be on the liquid indication level.

When indicating high-temperature and low-temperature liquids, the extended rod acoustic waveguide allows the placement of the acoustical-electrical transducer outside the zone with extremal temperature and pressure.

The new features of the detector design according to the present provide a detector with novel and patentable features.

DETAILED DESCRIPTION OF THE PREFERRED EMBODIMENTS

Figure 1:
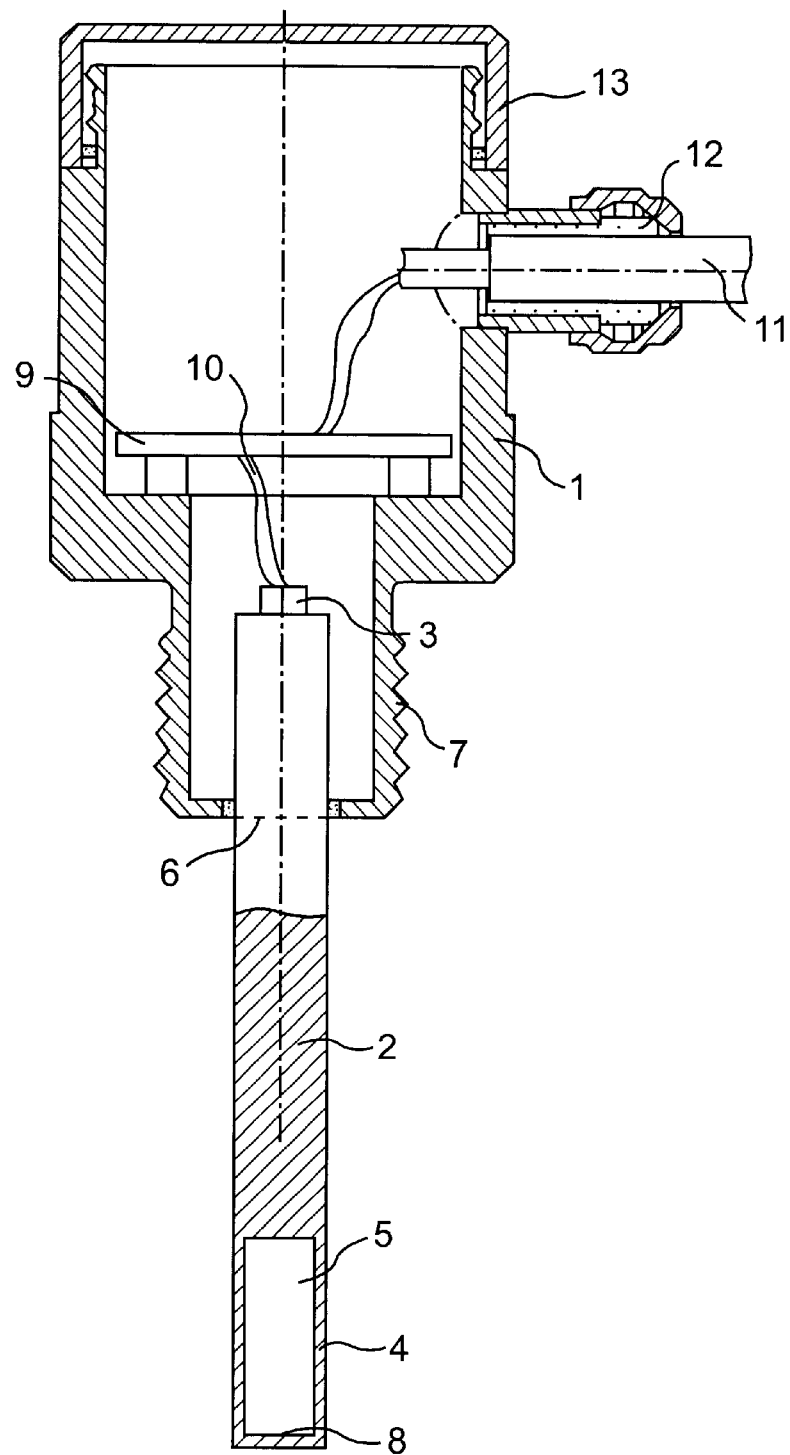
FIG. 1 represents the detector design.

The detector design (FIG. 1) includes a rod acoustic waveguide 2 on one end of which there is an acoustical-electrical transducer 3, on the other end is a hollow resonator 4. A detector case 1 is fixed rigidly and hermetically on the surface of the rod acoustic waveguide 2 in the zone of minimum oscillations 6 of the rod acoustic waveguide 2 at the detector operating frequency. The space 5 of the resonator 4 is isolated from the external medium by the plate 8. The case 1 contains an attachment means 7 for attaching said case 1 to an external base. The end of the rod acoustic waveguide 2 with the acoustical-electrical transducer 3 and an electronic circuit board 9 with an impulse generator circuit and a circuit for detector signals processing are placed in the detector case 1. The acoustical-electrical transducer 3 is connected with the board 9 by conductors 10. The detector board is connected to an external electrical circuit by a cable 11, which is introduced in the detector case 1 through a hermetic seal 12. A hermetic cover 13 isolates the detector case space with the board 9 from the external medium.

Figure 2:
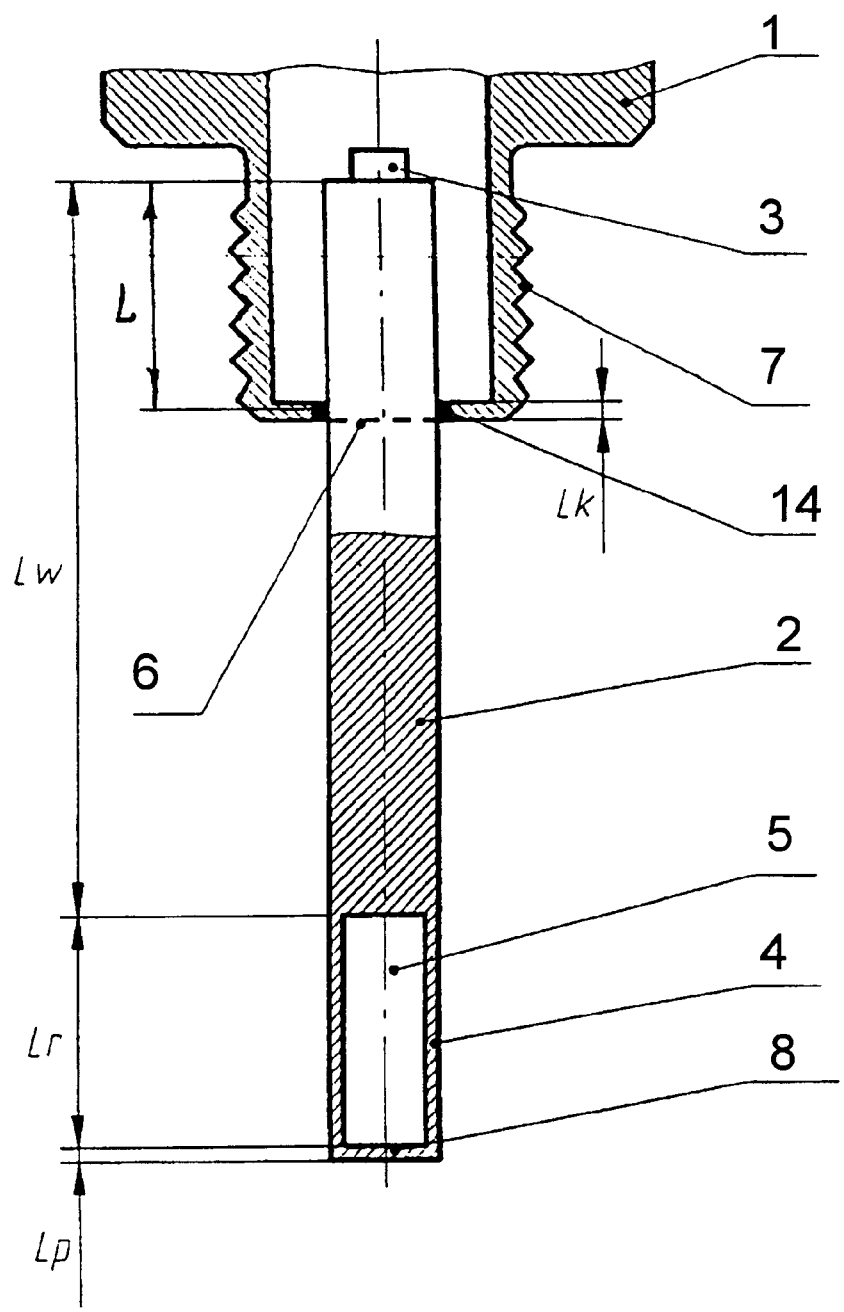
FIG. 2 represents fixing of the detector case to the rod acoustic waveguide.

The detector case 1 (FIG. 2) has a thickness of Lk with Lk<W/12 (W is the sound wavelength in the rod acoustic waveguide 2 at operating frequency) at the location the case 1 is fixed on the rod acoustic waveguide 2. This joint(fixing) 14 can be of welded type.

Figure 3:
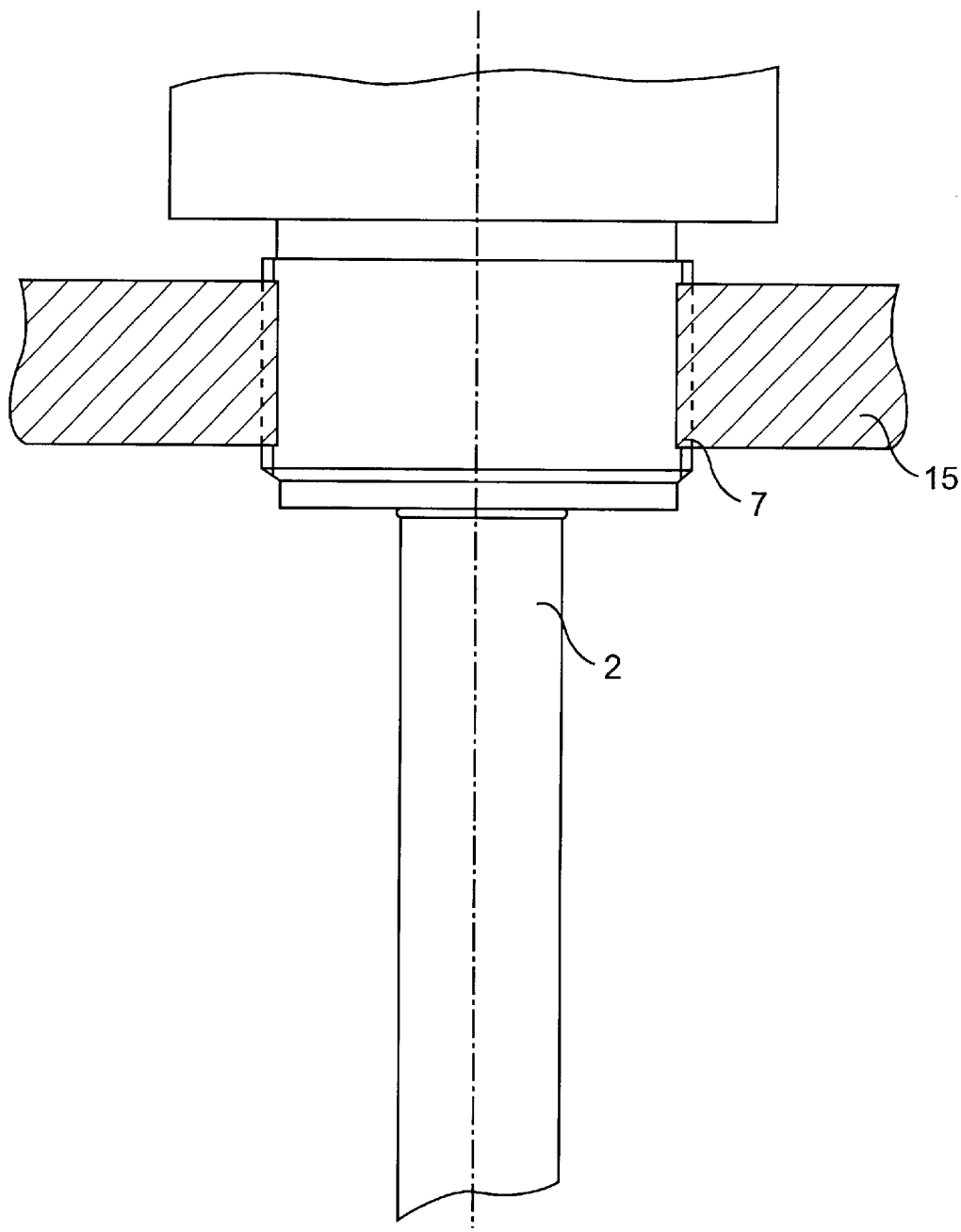
FIG. 3 represents a variant of detector fixing on the base.

The attachment means 7 for attaching said case 1 to the external base 15 is made in the form of a threaded connection (FIG. 3).

The detector operates as follows.

The acoustical-electrical transducer 3 situated on one end of the rod acoustic waveguide 2 generates periodical oscillations in the waveguide, which have the form of impulse signals with sinusoidal attributes. Impulse signals are generated by an electronic generator situated on the board 9. The signals propagate along the rod acoustic waveguide 2 and when they reach the hollow resonator 4 located on the opposite and of the acoustical-electrical transducer 3, oscillations in the resonator 4 are produced. The resonator 4 oscillations are damped ones, whereby the damping factor to a large extent depends on the properties of the medium in which the resonator is placed. If the medium has a small wave resistance at the operating frequency then the damping factor is small and oscillations damp slowly. If the medium in which the resonator is placed has a resistance comparable to the resonator output resistance, as an acoustic radiator, then acoustic oscillations appear in the medium and energy emissions from the resonator into the medium occur and are sufficient enough to increase the resonator damping factor. In this case the resonator 4 oscillations damp rapidly.

Figure 4A:
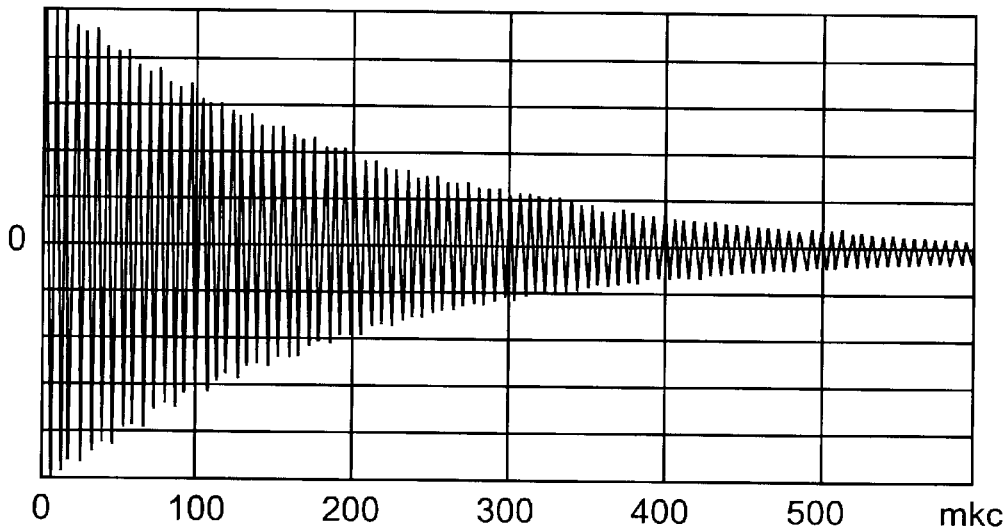
FIG. 4 represents time diagrams explaining the detector performance.
Figure 4B:
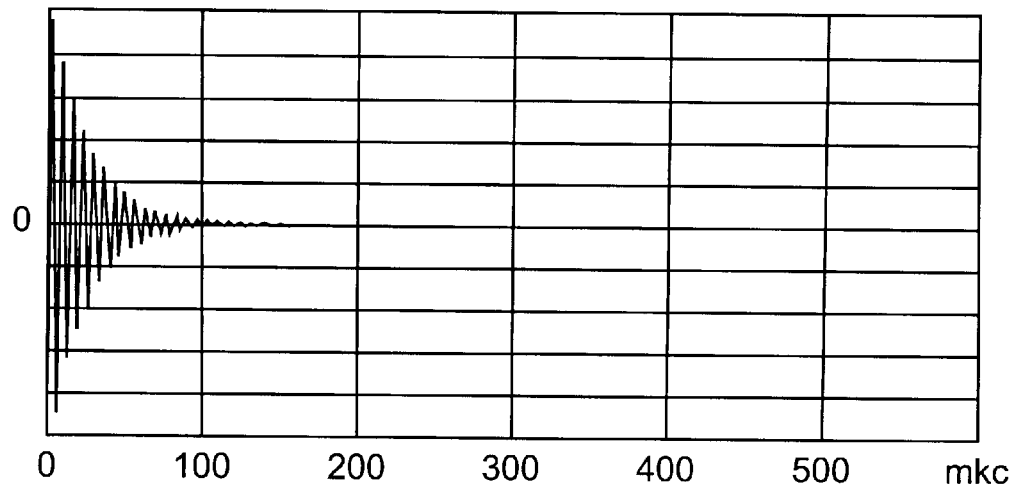

The resonator 4 oscillations propagate from the rod acoustic wave guide 2 towards the acoustical-electrical transducer 3, and when they reach the transducer 3 they are converted into an electrical signal oscillates (FIG. 4). This signal repeats in the waveguide and are similar to the resonator oscillations. Thus, the electrical signal has a form of slowly damped oscillations, i.e. oscillations which have a small damping factor if the resonator is placed in the medium with small resistance, for example in a gaseous one (upper oscillogram in FIG. 4). And vice versa, when the resonator is placed in the medium with a resistance greater than a gaseous medium resistance, for example in liquid, the electric signal has fast damped oscillations, i.e. oscillations with a greater damping factor (lower oscillogram in FIG. 4).

According to the damping factor, the detector signal processing circuit forms the output detector signal. This signal has a relay character and carries information about the type of the medium in which the resonator 4 is placed, namely whether the medium is liquid or gaseous. This signal is transmitted to the external circuit via the cable 11.

The detector space with the acoustical-electrical transducer 3 and the board 9 is isolated from the external medium by means of the welded joint of the rod acoustic waveguide 2 and the case 1, seal 12 of the cable 11, and the hermetic cover 13. Therefore the medium in which the detector case is placed does not influence operation of the electronic circuit and the transducer.

The vibrations of the base to which the detector is fixed do not reach the acoustical-electrical transducer and therefore they do not influence the detector operation. This is as a result of the threaded connection of the attachment means 7 which transmits the case oscillations to the detector case 1 inefficiently (because of oscillations energy absorption by friction surfaces of the threaded connection) as well as due to the location of the joint 14 in the zone of minimum oscillations of the rod acoustic waveguide 2. This zone is characterized by a significant resistance, which essentially prevents no oscillations from penetrating both from the waveguide and into the waveguide.

The liquid level detector has an oscillatory system Q-factor, which is determined by the properties of the medium in which the sensitive detector element—the hollow resonator—is placed.

Besides it is necessary that minimum rod oscillations where of the detector case is fixed on the waveguide, regardless the medium properties in which the detector is situated.

For this purpose the dimensions of three main parts of the detector—the waveguide, the resonator and the plate—should have certain wave related dimensions.

It is convenient technologically, if the main parts of the indicator oscillatory system (the waveguide, the resonator and the plate) are made from the same material and have the same external diameters.

The plate thickness Lp is chosen in such a way that it will have minimal affect on the resonator Q-factor. For this purpose the plate thickness should meet the following condition $$Lp < W/2\pi * \text{arctg}(\alpha) \tag{1}$$

where $\alpha$ is the ratio of a wall squared cross-section of the resonator and the waveguide. Preferably, Lp is less then W/12.

The hollow resonator length Lr and the waveguide length Lw are chosen in such a way that the whole mechanical oscillatory system has a resonance frequency equal to the operating one. Therefore, the resonance frequency does not depend on the wave resistance of the medium which contacts the resonator. Thus, the area of minimum waveguide oscillations does not depend on the medium wave resistance. For this purpose it is necessary that dimensions Lr and Lw meet the following equations:

$$Lw = (2*k+1)*W/4 + Lp \tag{2}$$

$$Lr = W/2\{n+1/\pi * \text{arctg}[2*\alpha(1+\alpha^2)*tg(4\pi Lp/W)]\} \tag{3}$$

where k, n—integer values.

If the mechanical system meets these conditions then the areas of minimum waveguide oscillations are located in distances equal to odd numbers of W/4, from the waveguide end on which the acoustical-electrical transducer is fixed.

For example, when the external diameter is 12 mm, the resonator hollow part diameter is 10 mm, and the plate thickness Lp=1 mm which is sufficient for obtaining a firm construction. It follows from (1) that the operating frequency wavelength in the material should be more than 21.2 mm. Let us choose the wave-length 36 mm, which for alloyed steel corresponds to the operating frequency of about 140 kHz. The resonator length according to (3) is equal to 26.65 mm when n=1. The waveguide length Lw from (2) will be 100 mm when k=5. Since the distance between the zone of the waveguide fixed on the case and the transducer shall be an odd number of wavelength quarters, this distance L in this case may be equal to 9 mm, 27 mm, 45 mm etc.

Industrial Applicability

The ultrasonic liquid level detector according to the invention can be used for level monitoring of different liquids including fire hazardous ones. The detector can be installed on any bases, it is simple in design and adaptable to streamlined production. It has high sensitivity and small dependence on operating conditions, in particular waveguide contamination.

High mechanical strength and absolute leak-proofness of the design allows the ultrasonic liquid level detector to be used in extreme conditions, including level indication of such products as liquefied gases, e.g. liquefied air.

Since the rod acoustic waveguide of the detector can be made rather long (tens of centimeters), there is an opportunity to separate the sensitive zone, i.e. the resonator from the acoustical-electrical transducer and the electrical circuit. Such separation possibility allows the detector to be used for measurement of high-temperature liquids.

What is claimed is:

1. An ultrasonic liquid level detector comprising a detector case, a rod acoustic waveguide on one end of which there is an acoustical-electrical transducer and on the other—a hollow resonator, wherein the resonator space is isolated from an external medium, and the detector case is fixed rigidly and hermetically on the surface of the rod acoustic waveguide in a zone of minimum rod oscillations of the rod acoustic waveguide at the detector operating frequency and contains an attachment means for attaching the detector case to an external base.

2. The detector according to claim 1, wherein the resonator space is isolated from the external medium by a plate which is rigidly and hermetically fixed to the rod acoustic waveguide, whereby the plate thickness is less than W/12, where W is the sound wavelength in the rod acoustic waveguide at operating frequency.

3. The detector according to claim 1, wherein a zone at which the case is fixed on the surface of the rod acoustic waveguide is located at a distance L from the acoustical-electrical transducer with $W/4*(2*k+1)+\frac{1}{3}>L>W/4*(2*k+1)-\frac{1}{3}$), where W is a sound wavelength in the rod acoustic waveguide at operating frequency, and k is an integer value.

4. The detector according to claim 1, wherein a thickness of the detector case where it is fixed on the rod acoustic waveguide is less than W/12, where W is the sound wavelength in the rod acoustic waveguide at operating frequency.

5. The detector according to claim 1, wherein said attachment means for attaching the detector to the external base is a threaded connection member.

* * * * *